US006641274B2

United States Patent
Sasako et al.

(10) Patent No.: US 6,641,274 B2
(45) Date of Patent: *Nov. 4, 2003

(54) SURFACE LIGHT SOURCE DEVICE

(75) Inventors: Hiromi Sasako, Tokyo (JP); Kayoko Masaki, Kawaguchi (JP)

(73) Assignees: Enplas Corporation, Kawaguchi (JP); Yasuhiro Koike, Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/825,504

(22) Filed: Mar. 31, 1997

(65) Prior Publication Data
US 2002/0057562 A1 May 16, 2002

(30) Foreign Application Priority Data

Mar. 29, 1996  (JP) .............................. 8-104445

(51) Int. Cl.⁷ ................ F21V 5/02; F21V 8/00
(52) U.S. Cl. .................. 362/31; 362/327; 362/330; 362/339
(58) Field of Search ................ 362/31, 26, 327, 362/328, 329, 330, 332, 339

(56) References Cited

U.S. PATENT DOCUMENTS

| 4,714,983 A | * | 12/1987 | Lang | 362/31 |
| 4,903,172 A | * | 2/1990 | Schoniger et al. | 362/31 |
| 5,055,978 A | * | 10/1991 | Rogoff | 362/31 |
| 5,446,627 A | * | 8/1995 | Oki et al. | 362/31 |
| 5,497,293 A | * | 3/1996 | Noguchi et al. | 362/31 |
| 5,590,945 A | * | 1/1997 | Simms | 362/31 |
| 5,598,280 A | * | 1/1997 | Nishio et al. | 362/31 |
| 5,719,649 A | * | 2/1998 | Shono et al. | 362/31 |

FOREIGN PATENT DOCUMENTS

JP   7-270708   10/1995

* cited by examiner

Primary Examiner—Thomas M. Sember
(74) Attorney, Agent, or Firm—Staas & Halsey LLP

(57) ABSTRACT

An improved surface light source device applicable to back lighting of a liquid display. In the surface light source device, a plate-shaped optical block (15) is disposed along an emitting surface of a plate-shaped optical member (11), to which illumination light is to be supplied from a primary light source (3), and has on at least one of its outer and inner sides a directivity modifying surface for modifying directivity of illumination light emitted from the emitting surface. Directivity modifying surface occupies at least part of the whole area of the optical block except a predetermined range (AR2) from a position aligning to the incidence surface of the plate-shaped optical member (11). The optical block (15) and the plate-shaped optical member (11) may be held in a unitary form by a holding mechanism formed integrally with the optical block (15) and/or the plate-shaped optical member (11). One end of a reflection member about the primary light source (3) may be pinched between the optical block (15) and the plate-shaped optical member (11).

22 Claims, 12 Drawing Sheets

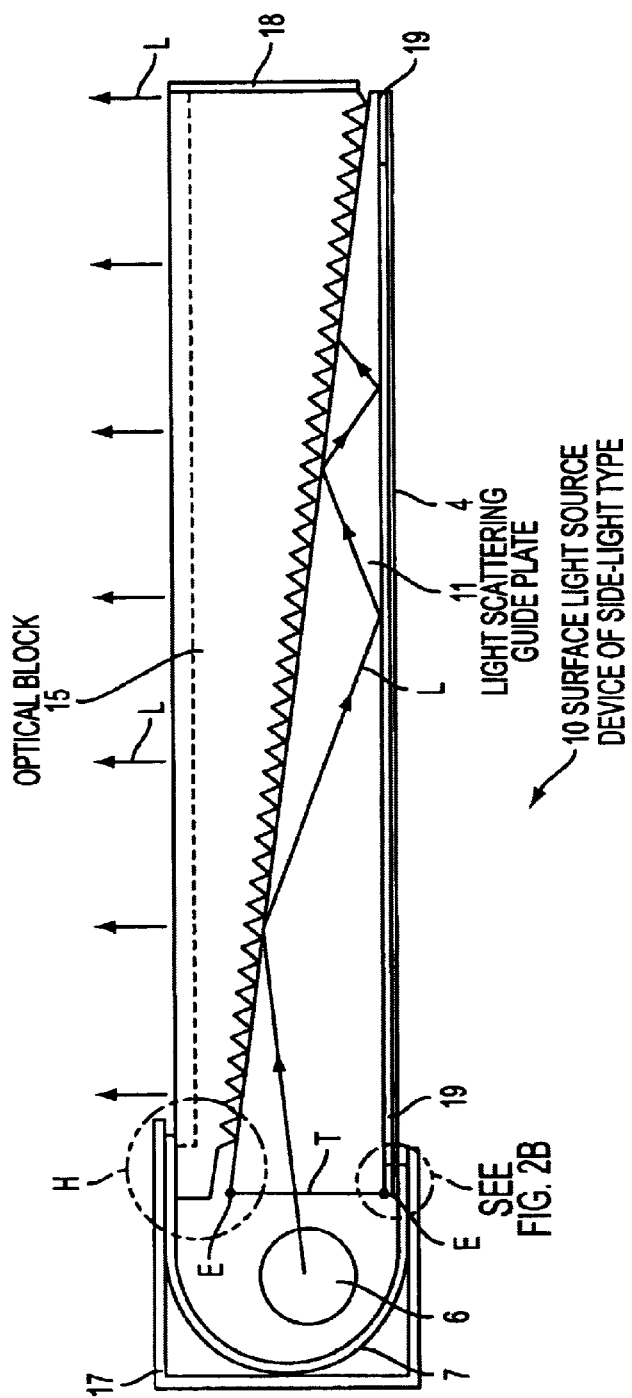
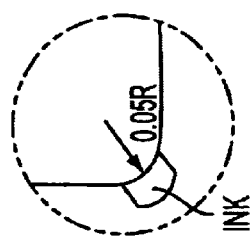
FIG. 2A
FIG. 2B

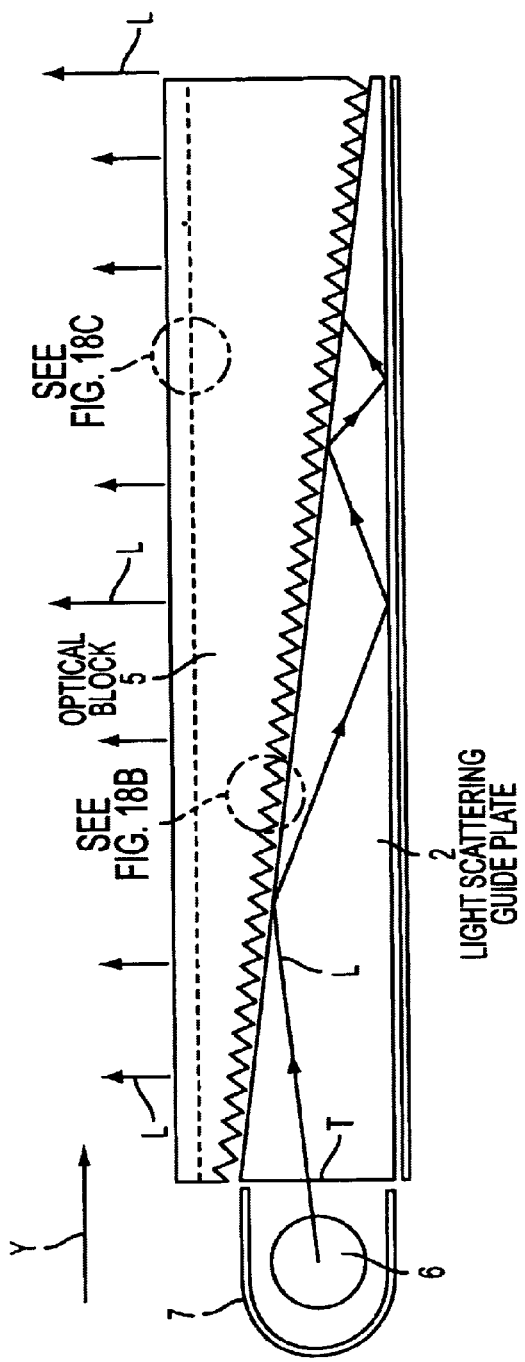
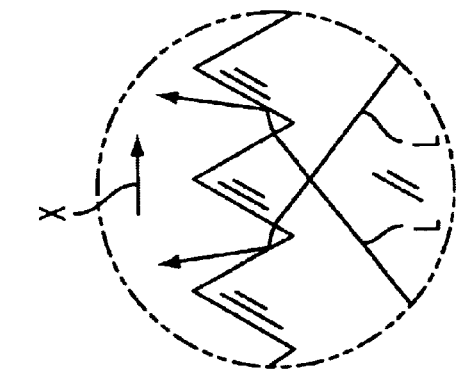
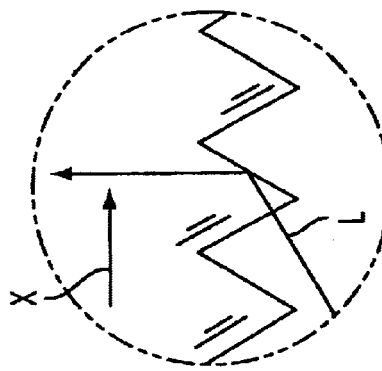
FIG. 18A (PRIOR ART)
FIG. 18B (PRIOR ART)
FIG. 18C (PRIOR ART)

SURFACE LIGHT SOURCE DEVICE

BACKGROUND OF THE INVENTION

This invention relates to a surface light source device, and more particularly to a surface light source device of the type in which directivity of illumination light is modified by at plate-shaped optical block. This invention is useful when applied to back lighting arrangement of a liquid crystal display and the like.

Surface light source devices of the type in which the direction of illumination light is corrected by a plate-shaped optical block are currently known and have been used in, for example, back lighting arrangement of a liquid crystal display. In a conventional surface light source device, a primary light source is disposed behind a plate-shaped optical member and, on the other hand, a light control member for modifying directivity of emitted light is disposed along an emitting surface of the plate-shaped optical member. In another conventional surface light source device, a primary light source is disposed near the side surface of a plate-shaped optical member and, on the other hand, a light control member for modifying directivity of emitted light is disposed along an emitting surface of the plate-shaped optical member. The latter device is called a sidelight-type surface light source device.

A typical primary light source to be used in a sidelight-type surface light source device is a rod-shaped light source. The rod-shaped light source is disposed along an end surface (incidence surface) of a plate-shaped optical member called the "light guide". Illumination light emitted from the primary rod-shaped light source is introduced into the light guide plate from an end surface (incidence surface) of the light guide plate. The illumination light is deflected in the light guide plate and is then emitted from the major surface (emitting surface) of the light guide plate. The emitted illumination light is used in, for example, back lighting of a liquid crystal panel. Generally, since a primary light source is disposed on the side of a light guide plate, a sidelight-type surface light source device can have a thin-type structure.

Known light guide plates to be used in the sidelight-type surface light source device include a light guide plate having a substantially uniform thickness and a light guide plate having a varying thickness gradually decreasing as the distance from the primary light source increases.

FIG. 17 is an exploded perspective view of a conventional sidelight-type surface light source device. As shown in FIG. 17, a sidelight-type surface light source device 1 comprises a light scattering guide plate 2, a primary light source 3 disposed on the side of the light scattering guide plate 2, a reflection sheet 4, and an optical block 5 as a light control member. The reflection sheet 4, the light scattering guide plate 2 and the optical block 5 are placed one over another. The light scattering guide plate 2 is a light guide plate made of a conventional light scattering guiding material.

The primary light source 3 is composed of, for example, a cold cathode ray tube (fluorescent lamp) 6 and a reflector 7 in the form of a regular reflection member partially surrounding the cold cathode ray tube 6. Illumination light is supplied from an opening of the reflector 7 toward an end surface (incidence surface) of the light scattering guide plate 2.

The reflection sheet 4 is a regular reflection sheet such as a metal foil, or an irregular reflection sheet such as a white polyethyleneterephthalate (PET) film. The reflection sheet 4 serves to return illumination light which is leaked from the light scattering guide plate 2 to the light scattering guide plate 2.

The light scattering guide plate 2 in the form of a wedge-shaped-cross-section light guide plate is composed of a matrix of, for example, polymechylmetacrylate (PMMA), and light-permeable particles different in index of refraction from the matrix and diffused uniformly in the matrix. As shown in FIG. 18, which is a cross-sectional view taken along line A—A of FIG. 17, illumination light L comes into the light scattering guide plate 2 from its one end surface near the primary light source, namely, an incidence surface T and propagates toward the wedge-shaped end as repeatedly reflected between a surface along the reflection sheet 4 and a surface along the optical block 5. In this specification, the surface along the reflection sheet 4 is called "inclined surface", and the surface along the optical block 5 is called "emitting surface".

During this propagation, illumination light L undergoes scattering by the light-permeable particles. If the reflection sheet 4 is irregular-reflective, it also causes irregular reflection. It should be noted that the incidence angle of illumination light L gradually decreases with respect to the emitting surface as the illumination light L is repeatedly reflected at the inclined surface.

Illumination light component whose incidence angle is less than the critical angle with respect to the emitting surface is emitted from the emitting surface. Thus the illumination light L emitted from the emitting surface has a characteristics tending to be scattered due to the light-permeable particles and also due to the reflection sheet 4, if the reflection sheet 4 is irregular-reflective. It is a common knowledge that, as is shown on an enlarged scale as indicated by an arrow B in FIG. 18, the main emitting direction of this illumination light L tends to be inclined to the end. This tendency or characteristics is called a "directional-emission characteristics" of the surface light source device or the light guide plate. Namely, the sidelight-type surface light source device 1 has a directional-emission characteristics.

The optical block 5 serves to modify this directivity. The optical block 5 may be made of light-transmission resin such as acrylic resin. The cross-sectional shape of the optical block 5 is designed in such a manner that the thickness varies complementarily with respect to the thickness of the light scattering guide plate 2. Namely, the thickness of the optical block 5 increases as the distance from the incidence surface of the optical scattering guide plate 2 increases.

The optical block 5 is has an inner surface facing the light scattering guide plate 2, and an outer surface facing in a direction opposite to the light scattering guide plate 2. A prism surface is formed on each of the inner and outer surface of the optical block 5. The prism surface is in the form of a repetition of triangular-cross-section projections each having a pair of inclined surfaces.

The rows of projections of the inner prism surface and the rows of projection of the outer prism surface extend perpendicularly to each other. The optical block 5 is oriented in such a manner that each row of projection of the inner prism surface extends parallel to the incidence surface, while each row of projection of the outer prism surface extends perpendicularly to the incidence surface.

As is shown on an enlarged scale as indicated by an arrow B in FIG. 18, the inner prism surface modifies directivity of emitted light, which is inclined from the incidence surface T toward the wedge-shaped end, into the frontal direction of the emitting surface. On the other hand, as is shown on an enlarged scale as indicated by an arrow C in FIG. 18, the outer prism surface modifies expansion of illumination light in the direction parallel to the incidence surface T. The direction from the incidence surface T toward the wedge-shaped end is hereinafter called the Y direction, and the direction parallel to the incidence surface T is hereafter called the X direction.

The light guide plate having a directional-emission characteristics the above-mentioned light scattering guide plate and a light guide plate made of transparent or semitransparent material and having a wedge-shaped or a approximately wedge-shaped cross section as well as a flat guide plate having on the incidence surface and/or rear surface a diffusion film, a matted surface, a micro lens array, etc. Also a sidelight-type surface light source device using any of these listed light guide plates, like the foregoing device, can emit illumination light to the frontal direction efficiently.

However, in the conventional sidelight-type surface light source device, as indicated by reference character D in FIG. 17, a bright-and-dark striped pattern parallel to the incidence surface tends to occur near the incidence surface. This striped pattern would deteriorates the quality of emitted light. Though bright lines and dark bands contained in the striped pattern could be reduced somehow by treating the incidence surface of the light scattering guide plate 2 and the edges of the incidence surface, such treatment does not suffice to eliminate uneven luminance.

SUMMARY OF THE INVENTION

With the foregoing problems in view, it is an object of this invention to provide an improved surface light source device of the type using a plate-shaped optical control member and more particularly a sidelight-type surface light source device that is improved so as to minimize non-uniform luminance about the incidence surface, thereby realizing high-quality illumination light output.

A surface light source device of this invention generally comprises a plate-shaped optical member, a rod-shaped light source disposed along an incidence surface of the plate-shaped optical member, and a plate-shaped optical block disposed along an emitting surface of the plate-shaped optical member for modifying directivity of illumination light emitted from the emitting surface of the plate-shaped optical member.

According to a mode (first mode) of the invention, the optical block has a directivity modifying surface on a portion of at least one of its outer and inner sides.

The partial area occupied by directivity modifying surface is defined as at least part of whole area of the outer and inner sides of the optical block except a predetermined range near the incidence surface of the plate-shaped optical member. Namely, the predetermined range near the incidence surface of the plate-shaped optical member is void of directivity modifying surface. Directivity modifying surface is in the form of a repetition of inclined surfaces which modify illumination light in directivity of light beam emitted from the emitting surface of a light guide plate.

If a reflection member is disposed about the rod-shaped light source for reflecting part of illumination light, which is emitted from the rod-shaped light source, to supply it to the light guide plate, one end of the reflection member may be pinched between the optical block and the plate-shaped optical member. And the optical block and the plate-shaped optical member may be held in a unitary form by a holding mechanism that is integrally formed with the optical block and/or the plate-shaped optical member.

According to another mode (second mode) of the invention, the optical block has on at least one of its inner and outer sides a directivity modifying surface and has a reflection member is disposed about the rod-shaped light source for reflecting part of illumination light, which is emitted from the rod-shaped light source, to supply it to a light guide member. One end of the reflection member is pinched between the optical block and the plate-shaped optical member. The optical block and the plate-shaped optical member may be held by a holding mechanism integrally formed with the optical block and/or the plate-shaped optical member.

In the first mode of the invention, since the area near the incidence surface is devoid of directivity modifying surface, various kinds of characteristics may be given to directivity-modifying-surface-free area to effectively avoid non-uniform luminance that would occur when such area is illuminated by illumination light. At that time, if one end of the reflection member is pinched between the optical block and the plate-shaped optical member, it is possible to simplify the holding mechanism of the reflection member.

Alternatively or additionally, if a holding mechanism is integrally formed with the optical block and/or the plate-shaped optical member, it is possible to hold the optical block and the plate-shaped optical member reliably in a unitary form.

In the second mode of the invention, directivity modifying surface occupies also the area near the incidence surface, and one end of the reflection member is pinched between the optical block and the plate-shaped optical member. Also in this case, although a holding mechanism may be integrally formed with the optical block and/or the plate-shaped optical member, the optical block and the plate-shaped optical member are held in a unitary form so as to pinch one end of the reflection member.

BRIEF DESCRIPTION OF THE DRAWINGS

FIG. 2 is a cross-sectional view taken along line E—E of FIG. 1;

FIG. 18 is a cross-sectional view taken along line A—A of FIG. 17.

EMBODIMENT

Various embodiments of this invention will now be described more in detail with reference to the accompanying drawings.

(First Embodiment)

Figure 1:
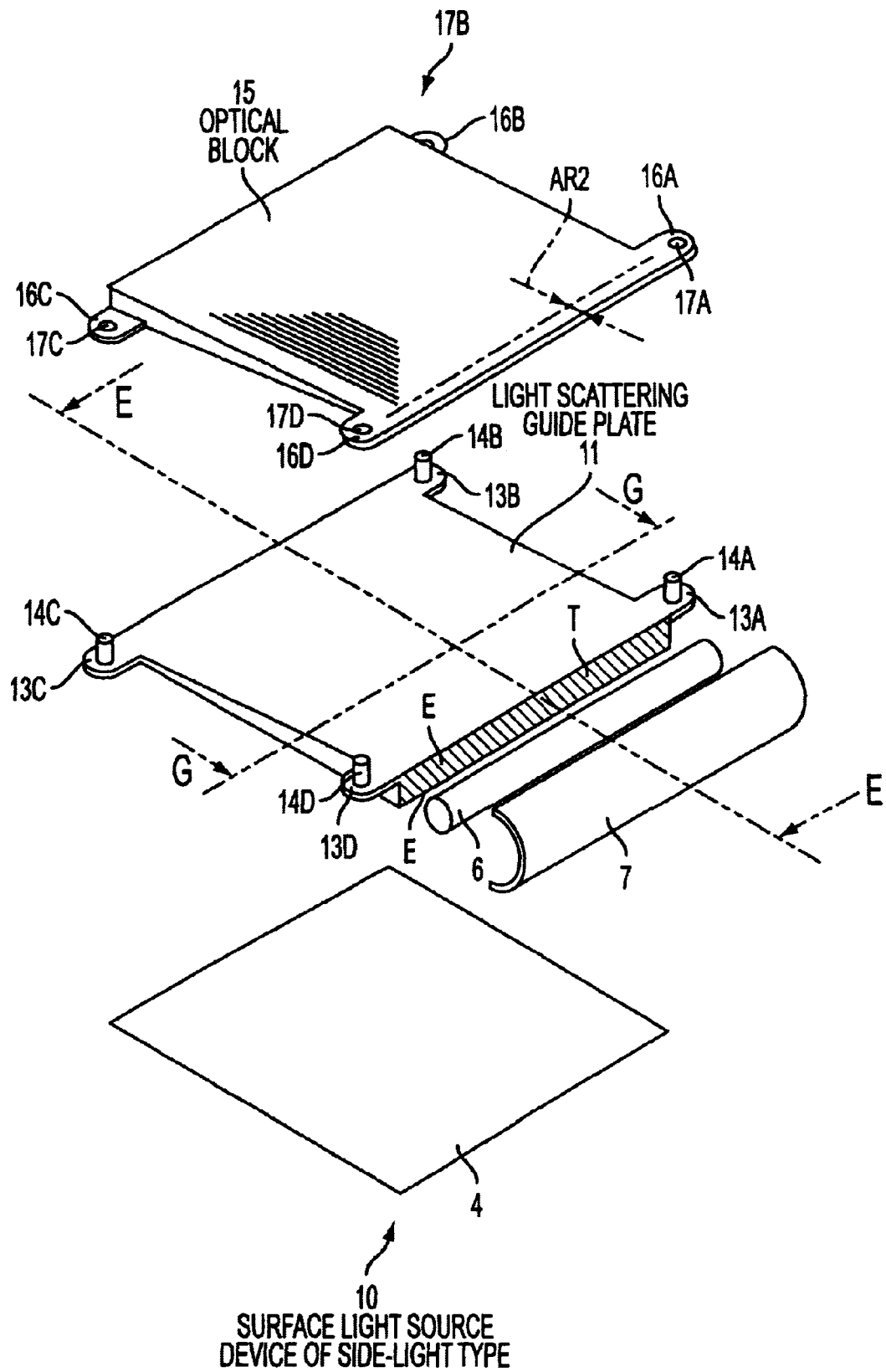
FIG. 1 is a perspective view of a sidelight-type surface light source device according to a first embodiment of this invention.
Figure 17:
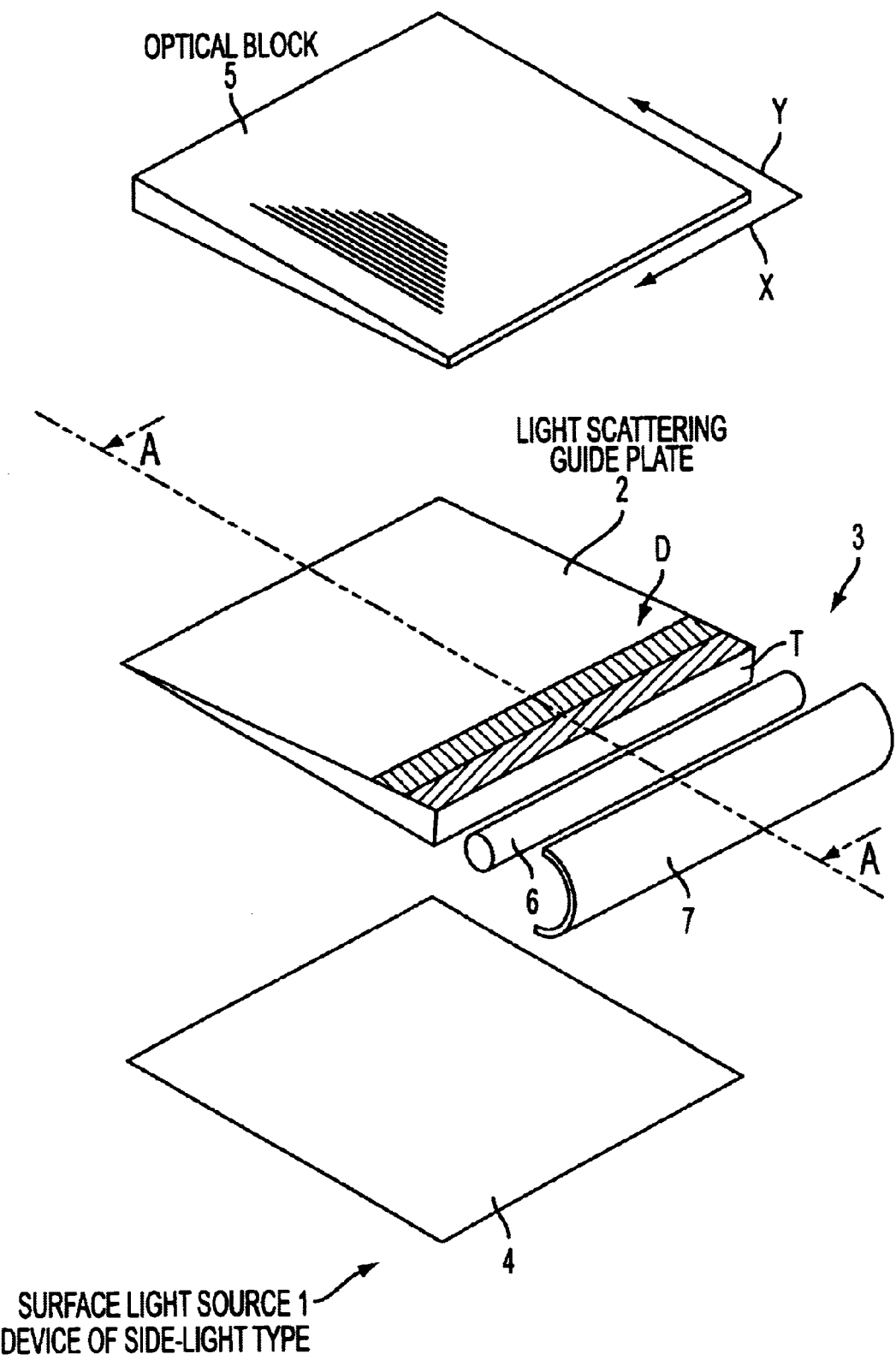
FIG. 17 is a perspective view showing a conventional sidelight-type surface light source device.

FIG. 1 shows a sidelight-type surface light source device according to a first embodiment of this invention, and FIG. 2 is a cross-sectional view taken along line E—E. In FIG. 1, parts or elements similar to those of FIG. 17 are designated by common reference numbers, and repeated description is omitted.

As shown in FIG. 1, a sidelight-type surface light source device 10 has a light guide plate of light scattering guide material, i.e., a light scattering guide plate 11. The light scattering guide material is composed of a matrix of polymechylmetacrylate and light-permeable particles diffused uniformly in the matrix.

The light scattering guide plate 11 has a wedge-shaped cross section. Illumination light L emitted from a primary light source 3 is introduced into the light scattering guide plate 11 from its end surface T serving as an incidence surface. As already described in connection with FIG. 17, while it is propagated in a zigzag way toward the end, the illumination light L is scattered in the light scattering guide plate 11 and, if the reflection sheet 4 is diffusive, is scattered by it. As a result, the illumination light L is emitted from the whole emitting surface with an oblique directivity.

The incidence surface T of the light scattering guide plate 11 is treated by matting so as to be a uniformly matted surface having a degree of roughness. Thus the incidence surface T is a rough surface with a light scattering function. To upper and lower edges E of the incidence surface T, ink is adhered as light-shielding means. Microscopically, each edge E has a curved surface whose radius of curvature is about 0.05 mm as indicated by reference character F in FIG. 2. This curved surface is covered with an ink layer.

This ink coating may be performed by pressing an auxiliary ink pad against the edges E of the light scattering guide plate 11 to transfer the ink to the edges E. The ink layer adhered to the edge E by a very small width serves as a light-shielding to prevent illumination light from entering into the light scattering guide plate 11 from the edge E.

In the absence of ink coating on the edge E, a light path coming into the light scattering guide plate 11 through the edge E would be formed as inclined by a large angle with respect to the incidence surface and inclined surface. Therefore, the component an incidence angle less than a critical angle with respect to the emitting surface is rich when it is repeatedly reflected near the incidence surface T so that excessive light would escape from the emitting surface. The illuminated edge E would be repeatedly observed as a luminous line due to the emitted excessive light.

This ink coating serves to prevent illumination light from being introduced into the light scattering guide plate 11 from the edge E and from being emitted from the emitting surface near the incidence surface T. As a result, any possible luminous line originating the emitted excessive light is eliminated to reduce unevenness in luminance.

On the other hand, illumination light coming into the light scattering guide plate 11 from the entire incidence surface T except the edges E tends to become insufficient near the incidence surface T in component less than a critical angle with respect to the incidence surface. Therefore, if the luminous line due to the edge E becomes difficult to see, the emitted light near the incidence surface would look considerably insufficient. If any luminous line occurs, this insufficiency of light is observed as a dark band.

Light scattering effect of the incidence surface T makes up such insufficient component of less than a critical angle and reduces the unevenness of luminance near the incidence surface. Namely, the matted incidence surface T draws the distribution of light emitted from the emitting surface close to the incidence surface side to reduce the unevenness in luminance.

The light scattering guide plate 11 has at corners of the incidence-surface side flanges 13A–13D projecting from side surfaces. Each flange 13A–13D has a cylindrical projection 14A–14D extending toward an optical block 15.

The optical block 15 has correspondingly at corners flanges 16A–16D projecting from side surfaces. Each flange 16A–16D has a circular through-hole 17A–17D.

The flanges 13A–13D and 16A–16D, the projections 14A–14D and the through-holes 17A–17D jointly provide the light scattering guide plate 11 and optical plate 15 with a holding mechanism.

Figure 3:
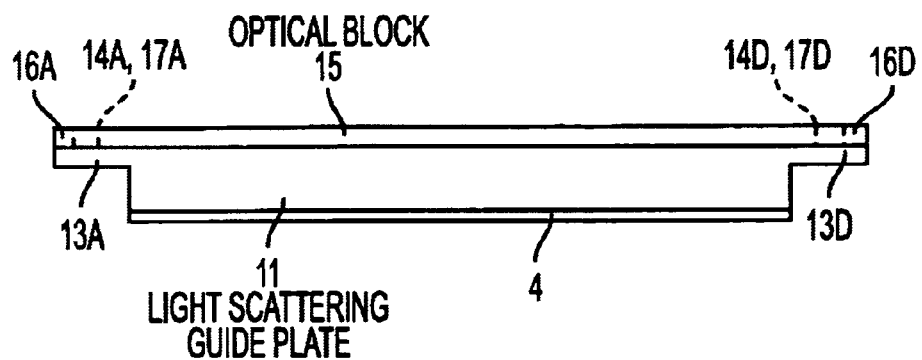
FIG. 3 is a cross-sectional view taken along line G—G of FIG. 1.

As shown in FIG. 3 which is a cross-sectional view taken along line G—G of FIG. 1, the projections 14A–14D are forced into the respective through-holes 17A–17D to hold the light scattering guide plate 11 and the optical block 15 in a unitary form simply with a simple construction.

The optical block 15 has a varying thickness gradually increasing as the distance from the incidence surface of the light scattering guide plate 11 increases; the optical block 15 is designed in such a manner that its thickness varies complementarily with respect to the thickness of the light scattering guide plate 11. Thus the total thickness of the optical block 15 and the light scattering guide plate 11 is uniform.

Figure 4:
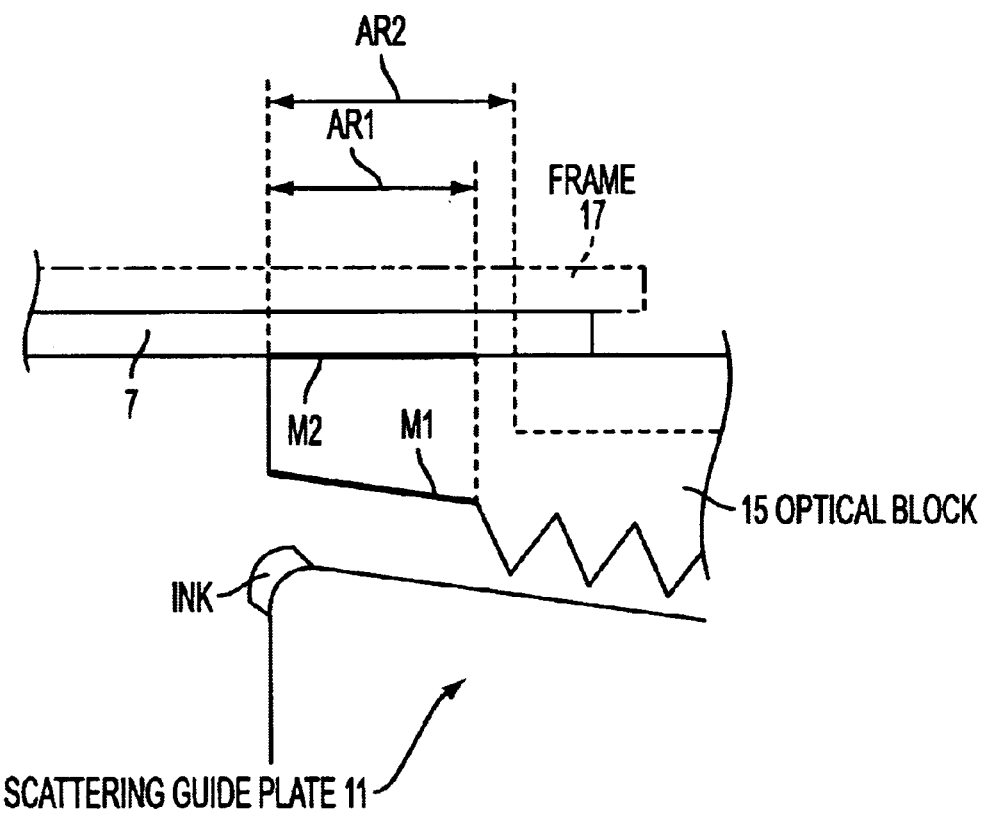
FIG. 4 is an enlarged cross-sectional view showing a portion near the incidence surface of the sidelight-type surface light source device of FIG. 1.

An area about the incidence surface is designated by reference character H in FIG. 2 and is shown on an enlarged scale in FIG. 4. As shown in FIG. 4, the optical block 15 has prism surfaces covering the whole inner and outer surfaces except predetermined areas AR1, AR2 near the incidence surface of the light scattering guide plate 11.

The inner prism surface includes a succession of inclined surfaces forming projections each extending parallel to the incidence surface and having a triangular cross section. The outer prism surface includes a succession of inclined surfaces forming projections each extending perpendicular to the incidence surface and having triangular cross section. The optical block 15 modifies directivity of illumination light, which is emitted from the light scattering guide plate 11, by these inclines surfaces and emits the thus modified illumination light. Namely, the prism surface provides a directivity modifying surface.

In this embodiment, with the reflection sheet 4 fixed to the light scattering guide plate 11, the upper and lower ends of the reflector 7 are pressed against the optical block 15 and the light scattering guide plate 11, respectively, by a U-cross-section frame 17 (FIG. 2).

The areas AR1, AR2 of the optical block 15 may be selected so as to be covered by the frame 17 and so as to include a range such that illumination light coming from the lower edge of the incidence surface T of the optical scattering guide plate 11 impinges on the emitting surface of the light scattering guide plate 11 at a critical angle.

Further, the inner area AR1 is constituted by a mirror surface M1 extending parallel to the emitting surface of the light scattering guide plate 11 from the base of the triangular projection. Accordingly, in the optical block 15, scattering of illumination light in the inner area AR1 near the incidence surface is effectively avoided. As a result, the area AR1 is not brightly illuminated so that occurrence of uneven luminance is prevented.

The outer area AR2 is constituted by a mirror surface M2 extending horizontally from the apex of the triangular-cross-section projection. Accordingly, in the optical block 15, scattering of illumination light in the outer area AR2 is effectively avoided. As a result, the area AR2 is not brightly illuminated so that occurrence of uneven luminance is prevented.

The upper end of the reflector 7 in the form of a sheet-shaped regular reflection member is attached to the optical block 15 at mirror surface M2 by a adhesive agent, which may be an ordinary type available on the market. Such commercially available adhesive agent has a high transmissivity and refractive index approximate to that of the optical block.

Also in the border surface of the reflector 7 and the mirror surface M2, the outer area AR2 is avoided from being brightly illuminated and from occurring uneven luminance which would be observed from the prism surface.

Further, at the end surface furthest from the incidence surface (FIG. 2), the optical block 15 holds a reflection sheet 18. The reflection sheet 18 returns illumination light leaking from such end surface into the optical block 15, thereby lowering the loss of illumination light. The reflection sheet 18, like the reflector 7, is a sheet-shaped regular reflection member and may be attached to the optical block 15 by the above-mentioned adhesive agent. This adhesive agent retards diffusion of illumination light at the end surface so that the excessive increase of luminance level near the end surface due to the diffusion is prevented.

The reflection sheet 4 (FIG. 2) may be held on the reflection surface of the light scattering guide plate 11 via a shock-absorbing sheet 19 in the form of a regular reflection member, using the same adhesive agent as that with the reflection sheet 18. Near the incidence surface, the width of the shock-absorbing sheet 19 is restricted within a range corresponding to the area AR1. Irregular reflection about the border surface of the light scattering guide plate 11 in the portion corresponding to area AR1 of the reflection sheet 4 is restricted. Therefore occurrence of uneven luminance originating from irregular reflection at this portion is prevented.

The frame 17 presses the lower end surface of the reflector 7 against the light scattering guide plate 11 to hold the reflector 7 from outside of the reflection sheet 4.

Part of illumination light coming into the light scattering guide plate 11 from the incidence surface T is introduced into the end of the optical block 15 which end is concealed by the frame 17. This partial light is reflected on the mirror surface M1 to return to the light scattering guide plate 11 or is allowed to pass through the mirror surface M1 and is then reflected on the mirror surface M2 and the reflector 7.

Irregular reflection of this illumination light is effectively avoided by the mirror M1. Further, irregular reflection of illumination light at the mirror surface M2 and at the border surface of the mirror surface M2 and the reflector 7 is effectively avoided by the mirror surface M2 and also by the adhesive agent between the mirror surface M2 and the reflector 7. Therefore, unevenness of luminance resulting from various causes is effectively avoided.

Further, illumination light component reaching the distal end surface (FIG. 2) of the optical block 15 is reflected into the optical block 15 by the reflection sheet 18 attached to the optical block 15 by the adhesive agent. Local increase of luminance level around the distal end is effectively avoided so that efficient use of illumination light is realized.

The above-described sidelight-type surface light source device 10 may be assembled in the following manner: First, the projections 14A–14D on the flanges 13A–13D integrally formed with the side surfaces of the light scattering guide plate 11 are forced into the respective through-holes 17A–17D of the flange 16A–16D integrally formed with the side surfaces of the optical block 15. The light scattering guide plate 11 and the optical block 15 are thus held together in a unitary form (FIG. 3), whereupon the reflection sheet 4, a fluorescent lamp 6, the reflector and the frame 17 are placed one over another.

According to this embodiment, prism surfaces are formed, as directivity modifying surfaces, on the whole area of the inner and outer sides of the optical block 15 except the areas AR1, AR2, which are concealed by the flame 17, near the incidence surface of the light scattering guide plate 11. Partly since the areas AR1, AR2 are formed on the mirror surface and, for the area AR2, partly since the reflector 7 is attached to and held on the optical block 15, scattering of illumination light at the areas AR1, AR2 is effectively avoided so that uneven luminance resulting from the brightness of these areas AR1, AR2 also can be effectively avoided.

The holding mechanism, which includes the flanges 13A–13D and 16A–16D, the projections 14A–14D and the through-holes 17A–17D, holds the light scattering guide plate 11 and the optical block 15 in a unitary form so that the sidelight-type surface light source device can be assembled simply with a simple construction/

(Second Embodiment)

Figure 5:
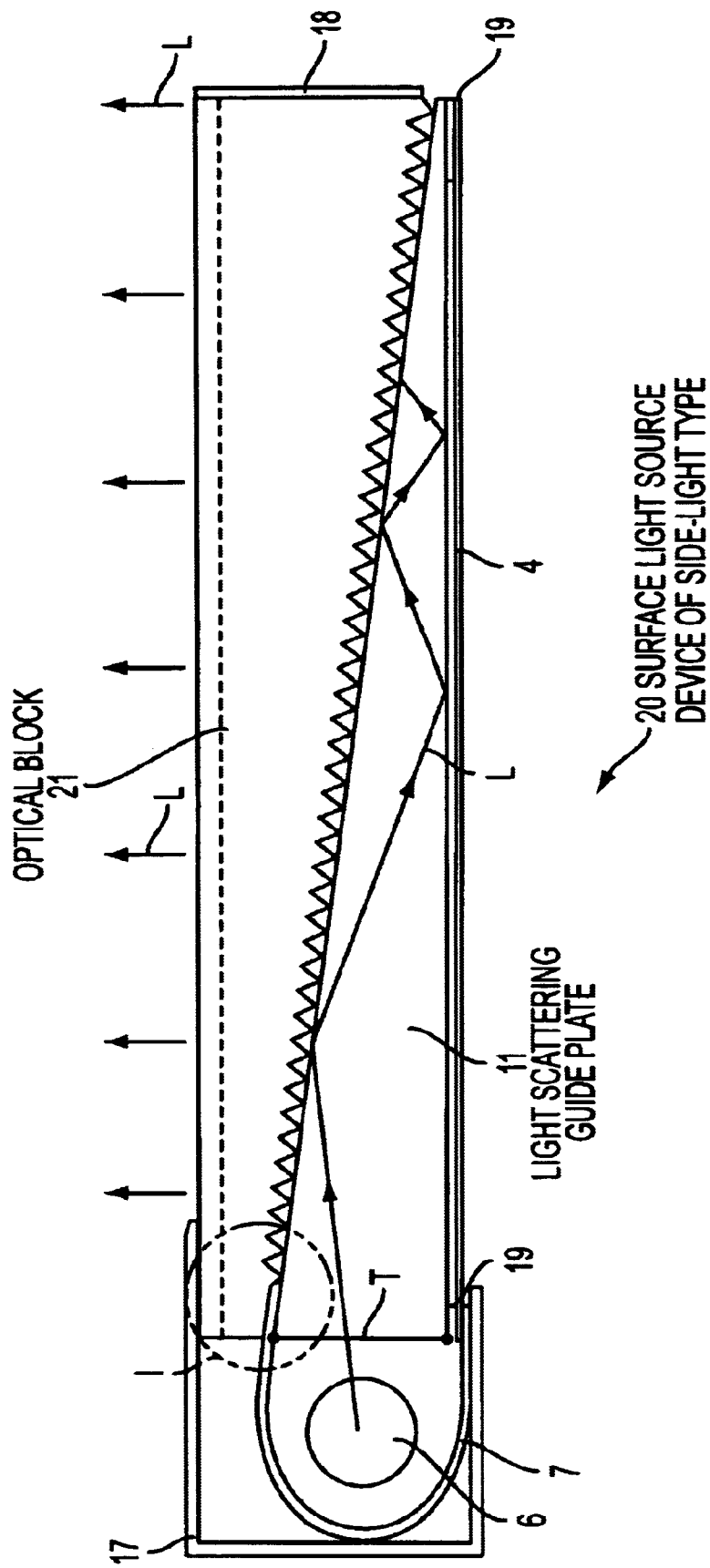
FIG. 5 is a cross-sectional view similar to FIG. 2, but showing a sidelight-type surface light source device according to a second embodiment of the invention.

FIG. 5 is a cross-sectional view similar to FIG. 2, but showing a sidelight-type surface light source device according to a second embodiment of the invention. Parts or element similar to those of the first embodiment are designated by common reference numbers, and repeated their description is omitted.

As shown in FIG. 5, a sidelight-type surface light source device 20 employs an optical block 21 instead of the optical block 15 in the first embodiment. The optical block 21, like the optical block 15, has flanges integrally formed and each having a through-hole so that the optical block 21 can be held as a unit with the light scattering guide plate 11 simply.

Figure 6:
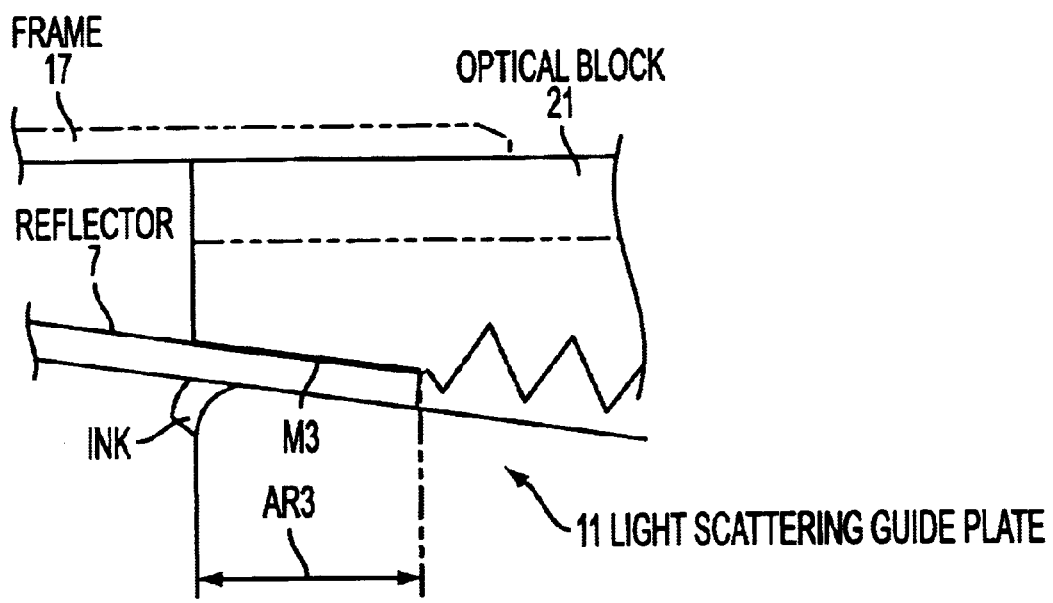
FIG. 6 is an enlarged cross-sectional view showing a portion near the incidence surface of the sidelight-type surface light source device of FIG. 5.

FIG. 6 shows on an enlarged scale an end portion of the optical block near the incidence surface T, which portion is designated by reference character I. As shown in FIG. 6, the optical block 21 pinches the upper end of a reflector 7 with the a light scattering guide plate 11 to hold the reflector 7. The optical block 21 has on its outer side a prism surface as a directivity modifying surface. Further, the optical block 21 has a prism surface on the inner side except an area AR3 near the incidence surface T which area is concealed by a frame 17.

In the area AR3, a plane M3 is formed so as to extend substantially parallel to the emitting surface of the light scattering guide plate 11 from the substantially center of the inclined surface of the projection of the prism surface. The reflector 7 is pinched between the plane M3 and the emitting surface of the light scattering guide plate 11.

In this embodiment, the light scattering plate 11 and the optical block 21 are provided with a holding mechanism for pinching the upper end of the reflector 7 to hold the reflector 7.

After the reflector 7 is positioned on the optical block 21, the optical block 21 and the light scattering guide plate 11 may be held in a unitary form simply by pressing the light scattering guide plate 11 against the reflector 7. Since one end of the reflector 7 is fixed, the sidelight-type surface light source device can be assembled much more simply.

(Third Embodiment)

Figure 7:
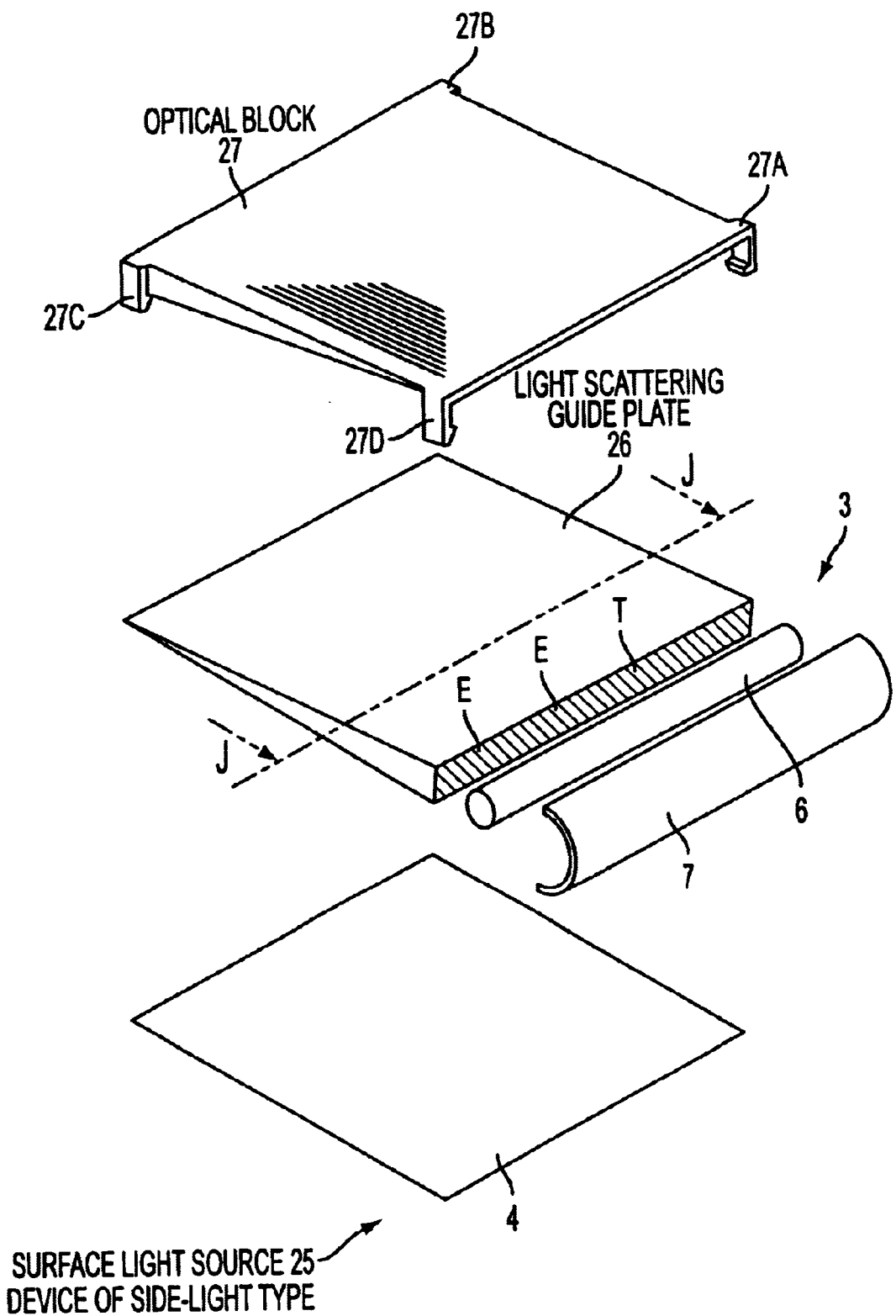
FIG. 7 is an exploded perspective view similar to FIG. 1, but showing a sidelight-type surface light source device according to a third embodiment of the invention.

FIG. 7 is an perspective view similar to FIG. 1, but showing a sidelight-type surface light source device according to a third embodiment of the invention. Parts or elements similar to those of the first embodiment are designated by common reference numbers, and repeated their description is omitted here.

Figure 8:
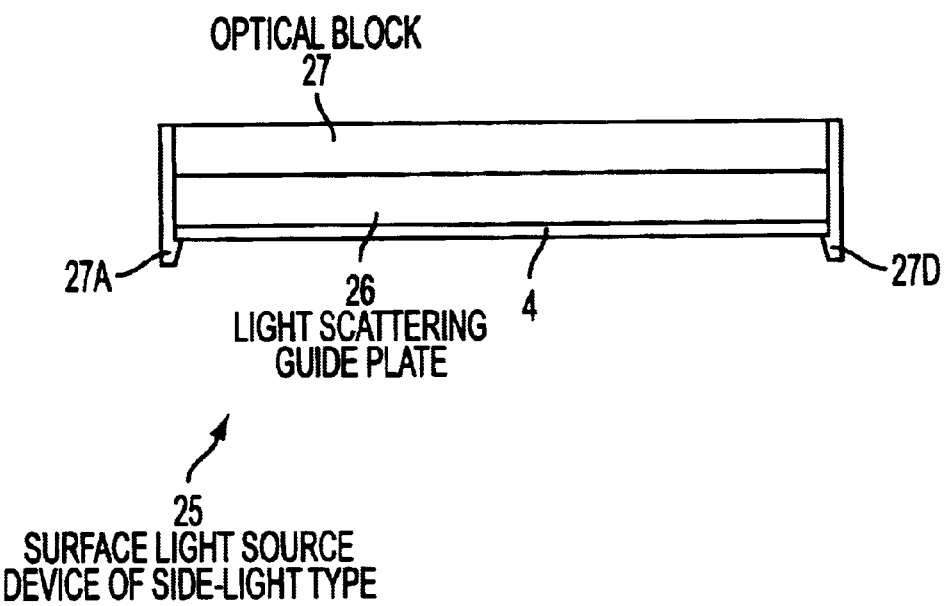
FIG. 8 is a cross-sectional view taken along line J—J of FIG. 7.

As shown in FIG. 7, a sidelight-type surface light source device 25 has a holding mechanism on an optical block 27. This holding mechanism holds a light scattering guide plate 26 and the optical block 27 in a unitary form. The light scattering guide plate 26 may be the same as the conventional light scattering guide plate except light-shielding on the edges E and matting on the incidence surface T. On the other hand, the optical block 27 has at four corners and sides claws 27A–27D projecting toward the light scattering guide plate 26. As shown in FIG. 8, which is a cross-sectional view taken along line J—J of FIG. 7, the optical block 27 holds the light scattering guide plate 26 by the claws 27A–27D. In this embodiment, like the second embodiment, the upper end of the reflector 7 is pinched between the light scattering guide plate 26 and the optical block 27.

According to the construction of FIG. 7, since the optical block 27 and the light scattering guide plate 26 are held in a unitary form by the holding mechanism integrally formed with the optical block 27, the same results as those in the second embodiment can be expected. If projections such as flanges are formed on side surfaces of the light scattering guide plate 26, illumination light reflected on the side surfaces might expand outwardly at the flanges so that the quantity of emitted light might be locally lowered to cause uneven luminance. However, as in this embodiment, a holding mechanism formed on the optical block avoid unevenness in luminance which would be caused by such projections as flanges.

(Fourth Embodiment)

Figure 9:
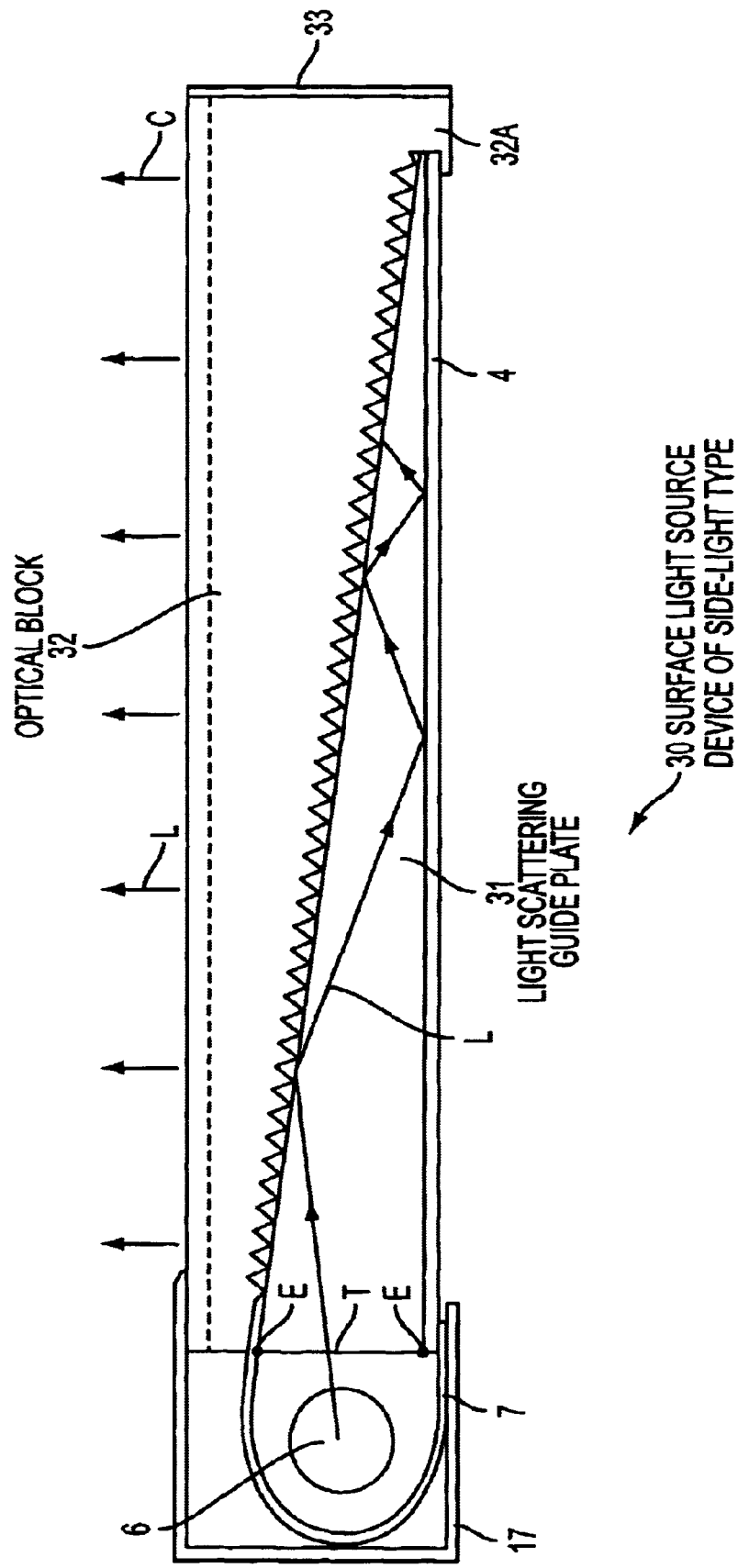
FIG. 9 is a cross-sectional view similar to FIG. 2, but showing a sidelight-type surface light source device according to a fourth embodiment of the invention.

FIG. 9 is a cross-sectional view similar to FIG. 2, but showing a sidelight-type surface light source device according to a fourth embodiment of the invention. Parts or elements similar to those of FIG. 2 are designated by common reference numbers, and repeated description is omitted here. As shown in FIG. 9, a sidelight-type surface light source device 30 has a holding mechanism on an optical block 32. A light scattering guide plate 31 and the optical block 32 are held in a unitary form by the holding mechanism.

The light scattering guide plate 31 may be the same as the conventional light scattering guide plate except light-shielding on the edges E and matting on the incidence surface T. On the other hand, the optical block 32 has at sides near the incidence surface T claws similar to those used in the third embodiment. The light scattering guide plate 31, the optical block 32 and a reflection sheet 4 are held in a unitary form by the claws.

The optical block 32 extends beyond the wedge-shaped end of the light scattering guide plate 31 and terminates in an end 32A. This end 32A has a U-shaped cross section and holds in the gap of the U shape the light scattering guide plate 31 and the reflection sheet 4.

Further, a light diffusion sheet 33 is attached by adhesion to the optical block 32 at its end surface near the wedge-shaped end of the light scattering guide plate 31. The optical block 32 allows illumination light to be emitted from the enlarged surface of the optical block 32, which is expanded toward the wedge-shaped end of the optical scattering guide plate 31, as compared to the light scattering guide plate 31. Reduction in quantity of illumination light at this enlarged portion is supplemented by the illumination light diffused by the diffusion sheet 33.

According to the construction of FIG. 9, the light scattering guide plate 31 and the reflection sheet 4 are held in the gap defined by the U-shaped end 32A. The same results as those with the third embodiment can be expected.

(Fifth Embodiment)

Figure 10:
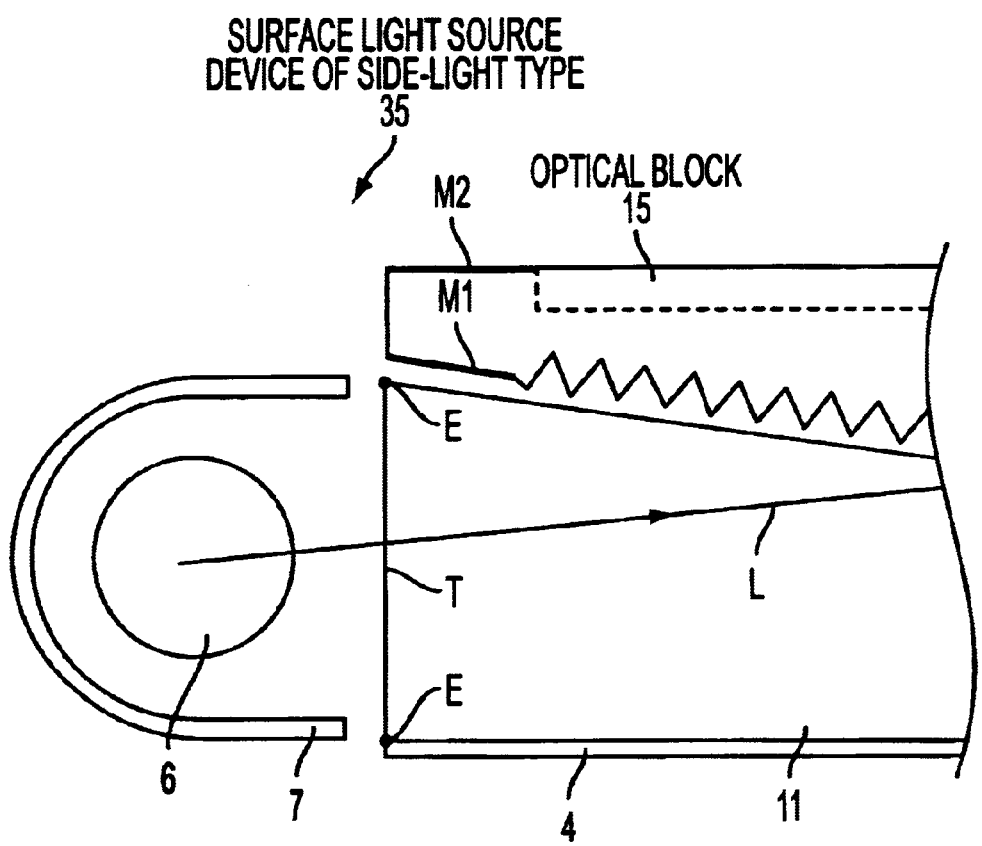
FIG. 10 is an enlarged cross-sectional view showing a portion near the incidence surface of a fifth embodiment of the invention.

FIG. 10 is a fragmentary enlarged cross-sectional view of a sidelight-type surface light source device according to a fifth embodiment of the invention, showing its portion about a light source. As shown in FIG. 10, in a sidelight-type surface light source device 35, a reflector 7 is held in such a manner that its end surface is in contact with the incidence surface T of a light scattering guide plate 11.

Even if the end surface of the reflector 7 is held in contact with the incidence surface T of the light scattering guide plate 11, the incidence-surface-side areas concealed by a frame near the incidence surface may be on mirror surfaces M1, M2 so that uneven luminance is reduced likewise the second embodiment.

(Other Embodiments)

In the foregoing embodiments, the successive projections of the optical block has a triangular cross section. Each projection has planes extending from a substantially central portion, a base portion and the apex. However this invention should not be limited to the foregoing examples.

Figure 11:
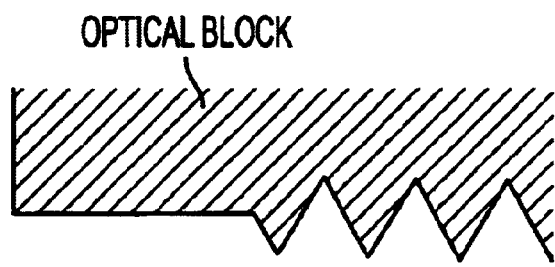
FIG. 11 is a fragmentary cross-sectional view illustrating a modification of the optical block.
Figure 12:
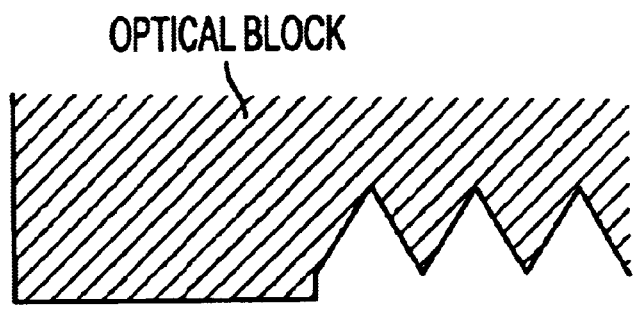
FIG. 12 is a fragmentary cross-sectional view illustrating another modification of the optical block.
Figure 13:
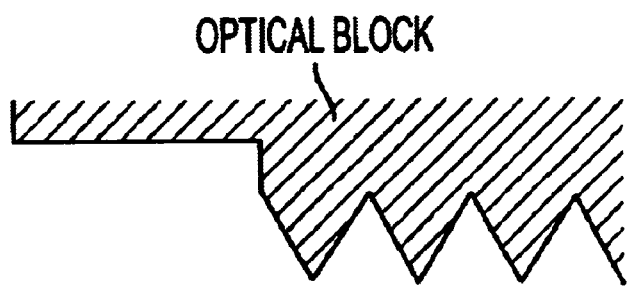
FIG. 13 is a fragmentary cross-sectional view illustrating still another modification of the optical block.
Figure 14:
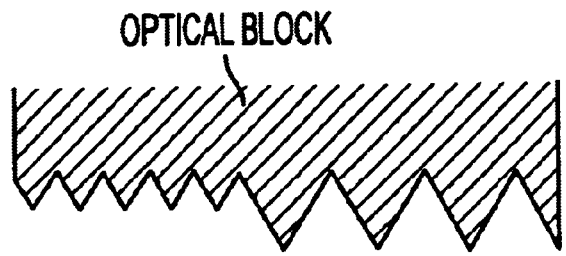
FIG. 14 is a fragmentary cross-sectional view illustrating a modification of the optical block of FIG. 13.

Regarding the inner and outer surfaces of the optical block, various modifications may be employed as shown in FIGS. 11–13.

In the example of FIG. 11, a flat surface extends from substantially central portion the projection. In the example of FIG. 12, a flat surface extends from a position beyond the apex of the projection. In the example of FIG. 13, a flat surface extends from a position off the base of the projection.

Further, in the foregoing embodiments, a predetermined incidence-surface-side area of the optical block which area is concealed by the frame is a mirror surface. However this invention should not be limited to this form.

For example, this predetermined area is set as various kinds of surfaces different from directivity modifying surface to improve the quality of the emitted light. Namely, if the area concealed by the frame is large, an area corresponding to this large area may be matted as a light diffusion surface, instead of roughing the incidence surface, so that occurrence of uneven luminance can be effectively avoided to correct the luminance level on the incidence surface side.

Alternatively, this may be done to correct the lowering of luminance level at the incidence-surface-side corner when a short fluorescent lamp is employed. Further, this may be done asymmetrically on opposite incidence-surface-side corners to correct uneven luminance resulting from the difference in quantity of light of the fluorescent lamp between on the hot side and the cold side.

In another alternative form, the fluorescent lamp being shifted, the different in luminance level at opposite incidence-surface-side corners may be corrected. Also if the reflector is to be pinched, a succession of very small triangular projections may be formed to increase the pinching force.

Furthermore, in the foregoing embodiments, directivity modifying surface is in the form of a succession of projections of triangular-cross-section projections as a repetition of inclined surfaces. However, this invention should not be limited to this form and various modifications of the repetition may be employed.

Figure 15:
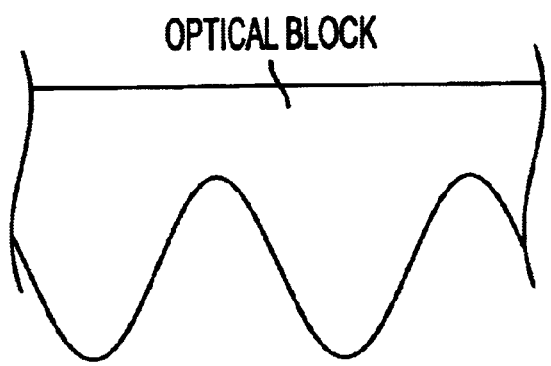
FIG. 15 is a fragmentary cross-sectional view illustrating a modification of the repetition-of-inclined-surfaces form of FIG. 14.
Figure 16:
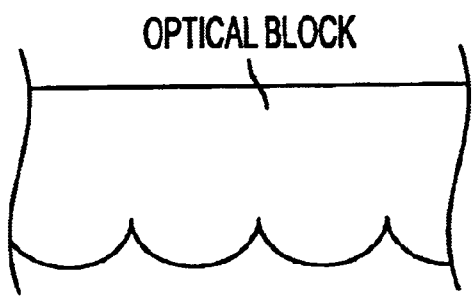
FIG. 16 is a fragmentary cross-sectional view illustrating a modification of the repetition-of-inclined-surfaces form of FIG. 15.

For example, as shown in FIG. 15, directivity modifying surface may be a repetition of sine-wave-form-cross-section projections. As shown in FIG. 16, directivity modifying surface may be a repetition of arcuate-cross-section projections.

Also, directivity modifying surface may be a repetition of three-sided or four-sided pyramids.

Further, a directivity modifying surface in the form of a repetition of different shapes may be formed on the outer and inner sides of the optical block. Or a directivity modifying surface may be formed on only one of the outer and inner sides of the optical block.

In the foregoing embodiments, the optical block and light scattering guide plate are held in a unitary form by a holding mechanism which is integrally formed with the optical block and/or the light scattering guide plate. And a mirror surface or the like is formed on part of the optical block to reduce uneven luminance.

However, means for reducing uneven luminance is not limited to this example. For example, the holding mechanism holding the optical block and the light scattering guide plate in a unitary form may be separate from the optical block or the light scattering guide plate.

Further, the holding mechanism to hold the optical block and the light scattering guide plate is not always accompanied by construction such that a mirror surface is formed on part of the optical block to reduce uneven luminance. Also the holding mechanism should not be limited to the foregoing embodiments.

In another alternative form, the optical block and the light scattering guide plate may be held in a unitary form with the frame.

As a matter of course, the light guide plate to be used in the surface light source device should not limited to that used in the foregoing embodiments. For example, the light scattering guide plate may be formed by dispersing silica particles in transparent resin. The light guide plate may not be a light scattering guide plate; for example, the light guide plate may be a wedge-shaped transparent member. Further, this invention may be applied to a sidelight-type light source device using a flat-plate-shaped light guide plate, a surface light source device in which illumination light of a primary light source comes in from a rear surface of a plate-shaped optical member, and various other kinds of surface light source devices.

In the foregoing embodiments, the surface light source device of this invention is applied to back lighting arrangement of a liquid crystal display. The application of this invention should not be limited to this application; for example, this invention may be widely applied to surface light source devices such as various kinds of illuminating equipment and display device.

As is described herein above in detail, according to this invention, since a directivity modifying surface is formed on at least part of the whole area except a predetermined incidence-surface-side range, it is possible to reduce uneven luminance of the emitted light by setting the predetermined incidence-surface-side range in various different values. As a result, it is possible to emit high-quality illumination light with a simple construction.

Further, by holding the optical block and the plate-shaped optical member in a unitary form by the holding mechanism integrally formed with the optical block and/or the plate-shaped optical member, it is possible to provide a surface light guide device which is simple in construction and easy to assemble.

Also by pinching the reflection member of the light source between the optical block and the plate-shaped optical member, it is possible to make the holding mechanism for the reflection member simple in construction.

What is claimed is:

1. A surface light source device comprising:
    a plate-shaped optical member having an incidence surface and an emitting surface;
    a rod-shaped light source disposed near the incidence surface of said plate-shaped optical member; and
    a plate-shaped optical block, separate from the plate-shaped optical member, disposed along the emitting surface of said plate-shaped optical member,
    said optical block having inner and outer sides with a directivity modifying surface provided on at least one of the inner and outer sides for modifying directivity of illumination light emitted from said emitting surface of said plate-shaped optical member,
    said directivity modifying surface including a repetition of inclined surfaces formed thereon, the inclined surfaces not being formed on said at least one side of the optical block in the vicinity of said incidence surface of said plate-shaped optical member.

2. A surface light source device according to claim 1, further comprising a reflection member disposed about said rod-shaped light source, one end of said reflection member being pinched between said optical block and said plate-shaped optical member.

3. A surface light source device according to claim 2, further including a holding mechanism which is constructed so as to enclose a part of at least one of said optical block and said plate-shaped optical member to hold said optical block and said plate-shaped in cooperation with each other.

4. A surface light source device according to claim 1, further including a holding mechanism which is constructed so as to enclose a part of at least one of said optical block and said plate-shaped optical member to hold said optical block and said plate-shaped in cooperation with each other.

5. A surface light source device according to claim 1, further comprising a reflection layer which is formed on the plate-shaped optical block in the vicinity of said incidence surface of said plate shaped optical member, where the inclined surface is not formed.

6. A surface light source device comprising:

a plate-shaped optical member having an incidence surface and an emitting surface;

a rod-shaped light source disposed near the incidence surface of said plate-shaped optical member;

a plate-shaped optical block, separate from the plate-shaped optical member, disposed along the emitting surface of said plate-shaped optical member;

a reflection member disposed about said rod-shaped light source, one end of said reflection member being pinched between said optical block and said plate-shaped optical member, said optical block having inner and outer sides with a directivity modifying surface provided on at least one of the inner and outer sides for modifying directivity of illumination light emitted from said emitting surface of said plate-shaped optical member, said directivity modifying surface including a repetition of inclined surfaces formed thereon, the inclined surfaces not being formed on said at least one side of the optical block in the vicinity of said incidence surface of said plate-shaped optical member.

7. A surface light source device comprising:

a plate-shaped optical member having an incidence surface and an emitting surface;

a rod-shaped light source disposed near the incidence surface of said plate-shaped optical member;

a plate-shaped optical block, separate from the plate-shaped optical member, disposed along the emitting surface of said plate-shaped optical member and having inner and outer sides with a directivity modifying surface provided on at least one of the inner and outer sides for modifying directivity of illumination light emitted from said emitting surface of said plate-shaped optical member, said directivity modifying surface including a repetition of inclined surfaces formed thereon, the inclined surface not being formed on said at least one side of the optical block in the vicinity of said incidence surface of said plate-shaped optical member; and a holding mechanism which is constructed so as to enclose a part of at least one of said optical block and said plate-shaped optical member to hold said optical block and said plate-shaped optical member in cooperation with each other.

8. A surface light source device according to claim 7, further comprising a reflection layer which is formed on the plate-shaped optical block in the vicinity of said incidence surface of said plate shaped optical member, where the inclined surface is not formed.

9. A surface light source device comprising:

a plate-shaped optical member having an incidence surface and an emitting surface;

a light source disposed near the incidence surface of said optical member; and a plate-shaped optical block, separate from the plate-shaped optical member, disposed along the emitting surface of said optical member, the optical block having inner and outer sides and a first end, the first end being positioned in the vicinity of the incidence surface of the optical member and in the vicinity of the light source, a repetition of inclined surfaces being formed on at least one of the inner and outer sides of the optical block, the inclined surfaces not being formed on said at least one side of the optical block in the vicinity of the first end.

10. A surface light source device according to claim 9, wherein the incidence surface of the optical member has upper and lower edges, the upper and lower edges being covered with ink.

11. A surface light source device according to claim 9, wherein the incidence surface of the optical member has upper and lower edges, the upper and lower edges being rounded and covered with ink.

12. A surface light source device according to claim 9, wherein the optical member and the optical block have corresponding projections therefrom to fix the position of the optical member with respect to the optical block.

13. A surface light source device according to claim 9, wherein the optical member has a thickness that decreases with increasing distance from the incidence surface, and the optical block has a thickness that increases with increasing distance away from the first end.

14. A surface light source device according to claim 9, further comprising a U-shaped frame positioned to press the optical member against the optical block.

15. A surface light source device according to claim 9, further comprising:

a reflector having first through third portions with the second portion at least partially surrounding the light source; and a U-shaped frame positioned to press the optical member against the optical block, the first portion of the reflector being positioned between the U-shaped frame and the optical member and the third portion of the reflector being positioned between the U-shaped frame and the optical block.

16. A surface light source device according to claim 9, wherein the optical block has a second end opposed to the first end thereof, the second end being covered with a reflection sheet.

17. A surface light source device according to claim 9, wherein the optical member has a reflecting surface opposing the emitting surface, the reflecting surface being covered with a reflection sheet.

18. A surface light source device according to claim 17, wherein a shock absorbing sheet is interposed between a portion of the reflecting surface and the reflection sheet.

19. A surface light source device according to claim 9, wherein a reflection layer is formed on said at least one side of the optical block in the vicinity of the first end, where the inclined surfaces are not formed.

20. A surface light source device comprising:

a plate-shaped optical member having an incidence surface and an emitting surface;

a light source disposed near the incidence surface of said optical member; and a plate-shaped optical block, separate from the plate-shaped optical member, the optical block having inner and outer sides and a first end, the first end being positioned in the vicinity of the incidence surface of the optical member and in the vicinity of the light source, the inner surface being disposed along the emitting surface of said optical member, a repetition of inclined surfaces being formed on at least the inner side of the optical block, the inclined surfaces not being formed on said at least one side of the optical block in the vicinity of the first end.

21. A surface light source device comprising:

a plate-shaped optical member having an incidence surface and an emitting surface;

a light source disposed near the incidence surface of said optical member; and a plate-shaped optical block, separate from the plate-shaped optical member, the optical block having inner and outer sides and a first end, the first end being positioned in the vicinity of the incidence surface of the optical member and in the vicinity of the light source, the inner surface being disposed along the emitting surface of said optical member, the plate-shaped optical block having a thickness which increases with increasing distance from the incidence surface a repetition of inclined surfaces being formed on at least on of the inner and outer sides of the optical block, the inclined surfaces not being formed on said at least one side of the optical block in the vicinity of the first end.

22. A surface light source device according to claim 21, wherein the plate-shaped optical member has a thickness which decreases with increasing distance from the incidence surface.

* * * * *